3,067,212
Patented Dec. 4, 1962

3,067,212
PRODUCTION OF EQUILIN AND
INTERMEDIATES
Albert Bowers, Carlos Casas-Campillo, John Anthony Zderic and Carl Djerassi, all of Mexico City, Mexico, assignors, by mesne assignments, to Syntex Corporation, a corporation of Panama
No Drawing. Filed Apr. 16, 1959, Ser. No. 806,763
Claims priority, application Mexico Apr. 24, 1958
10 Claims. (Cl. 260—397.4)

The present invention relates to a process for the production of cyclopentanophenanthrene compounds and to novel cyclopentanophenanthrene compounds.

More particularly the present invention relates to the synthesis of equilin, the important natural estrogenic hormone and novel intermediates.

Equilin is the only known naturally occurring, physiologically active steroid hormone which until now has resisted all attempts at partial or total synthesis. This potent estrogen is currently available only from mare's urine. One of the difficulties in the successful preparation of equilin is the presence of the non-conjugated double bond in ring B which is responsible for its ready isomerization with acid or its aromatization to equilenin.

In accordance with the present invention we have discovered that equilin may be prepared in good yield from a 17-ester of testosterone or 19-nor testosterone by a process involving introduction of an additional double bond between C–6 and C–7 forming the 3-enol lower fatty acylate, i.e. a $\Delta^{3,5,7}$ compound, saturating the double bond between C–3 and C–4 and hydrolyzing the ester groups at C–3 and C–17, oxidation of the resulting compound to a $\Delta^{4,7}$-diketone and aromatizing ring A, with in the case of the 10-methyl compounds elimination of the 10-methyl groups. In the case of the 10-methyl compounds the aromatization is carried out by dehydrogenating the $\Delta^{4,7}$-androstadiene-3,17-dione to $\Delta^{1,4,7}$-androstatrien-3,17-dione followed by pyrolysis and in the case of the 19-nor compound, i.e. 19-nor-$\Delta^{4,7}$-androstadien-3,17-dione, the aromatization occurs in one step upon dehydrogenation at C–1(2).

We obtained equilin starting from a 17-ester of testosterone or of its 19-nor-analog, preferably from its acetate (I), through the sequence of reactions illustrated by the following formulas:

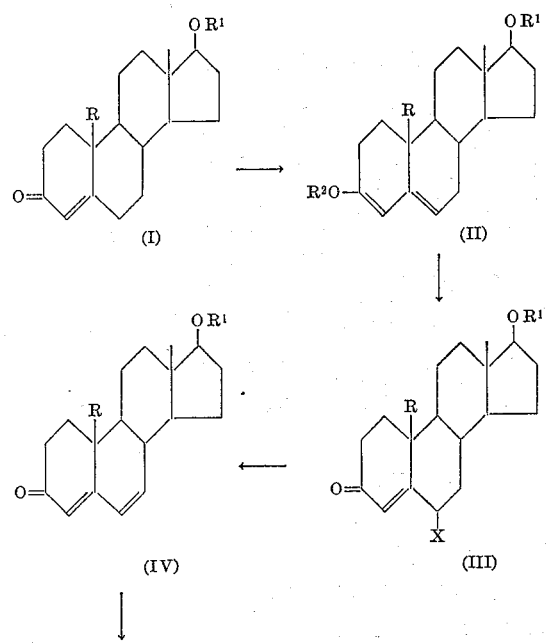

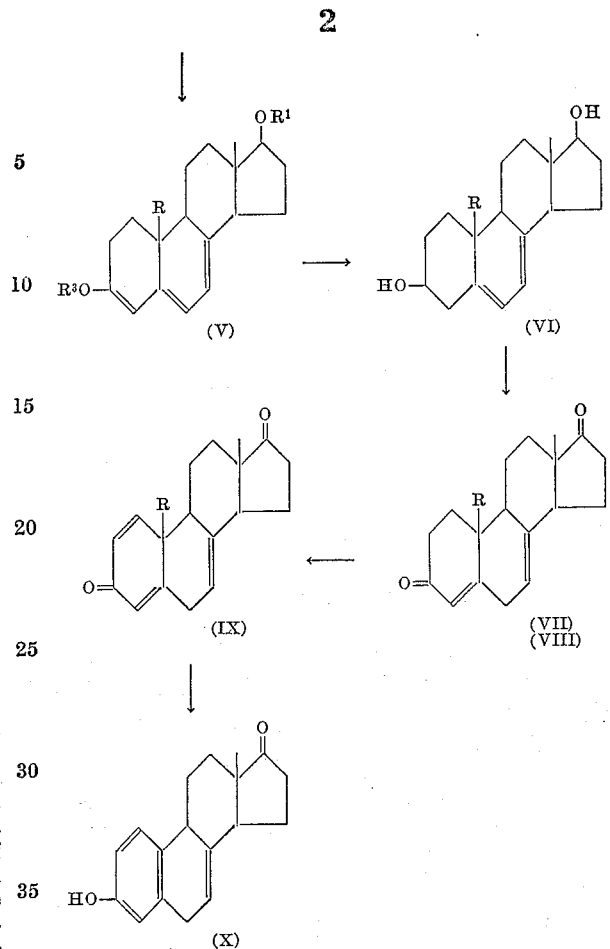

In the above equation R represents hydrogen or methyl. $R^1$ represents a hydrocarbon carboxylic ester group of up to 12 carbon atoms, preferably a lower fatty acid ester group such as acetate. $R^2$ represents lower alkyl preferably ethyl. X represents chloro or bromo preferably bromo. $R^3$ represents lower fatty acid acyl, preferably acetate.

We converted I into its 3-ethyl-enol-ether (II), which was treated with hypobromous acid to produce the known 6$\beta$-bromo-testosterone acetate or the so far unknown 6$\beta$-bromo-19-nor-testosterone acetate (III). The enol-ether was produced by known methods, for example by reaction with ethyl orthoformate in mixture with ethanol and dioxane, under anhydrous conditions and in the presence of p-toluenesulfonic acid; the reaction with hypobromous acid can be effected with any reagent capable of liberating such acid, such as a N-bromoimide or N-bromoamide, of the hypobromite of an alkali or alkali-earth metal; preferably we employed N-bromo-succinimide in mixture with sodium acetate, acetic acid and acetone.

We then dehydrobrominated III to $\Delta^{4,6}$-androstadien-17$\beta$-ol-3-one 17-acetate, or its 19-nor-analog, respectively (IV), for example by refluxing with calcium carbonate in mixture with dimethylformamide. We then heated IV with an excess of acetyl chloride and acetic anhydride, preferably in the presence of pyridine, and thus we produced $\Delta^{3,5,7}$-androstatriene-3$\beta$,17$\beta$-diol diacetate (V; R=Me)

or its 19-nor-analog (V; R=H).

Out of the two double bonds of V, we selectively saturated the one between C–3 and C–4, and at the same time hydrolyzed the acetate groups, by reaction with a double hydride; for example, we refluxed with sodium borohydride in mixture with tetrahydrofurane, methanol and water. Thus we obtained Δ$^{5,7}$-androstadiene-3β,17β-diol (VI; R=Me) or 19-nor-Δ$^{5,7}$-androstadiene-3β,17β-diol (VI; R=H), respectively.

Upon oxidation by the method of Oppenauer, that is, by reaction with aluminum isopropylate in the presence of a hydrogen acceptor, we converted the 10-methyl compound of Formula VI into Δ$^{4,7}$-androstadiene-3,17-dione (VII), the preparation of which, by a different route, has already been described in the literature. The same oxidation converted the 19-nor-compound of Formula VI into 19-nor-Δ$^{4,7}$-androstadiene-3,17-dione (VIII).

We then dehydrogenated VII between C–1 and C–2 by incubation with microorganisms, such as *Corynebacterium simplex*, Mycobacterium sp. or a fungus of the Septomyxa genus, or also by purely chemical methods, such as refluxing with selenium dioxide. The best results were obtained by incubation with *Septomyxa affinis* ATCC 6737 in an aqueous medium containing peptone and corn syrup, at temperatures around 28° C. under aeration for periods of 12 to 72 hours. The resulting Δ$^{1,4,7}$-androstatriene-3,17-dione (IX) was heated, in mixture with mineral oil or tetraline, at temperatures around 600° C., with pyrolysis furnished the desired equilin (X).

In the case of 19-nor-Δ$^{4,7}$-androstadiene-3,17-dione (VIII), we achieved the aromatization of ring A in only one step by incubation with microorganisms, such as those mentioned above, or by treatment with selenium dioxide, N-bromosuccinimide, N-bromoacetamide or similar reagents. Preferably we incubated VIII with *Corynebacterium simplex* ATCC 4964 in an aqueous medium containing yeast extract at a temperature of about 28° C. and for a period of time between 12 and 72 hours, and thus we obtained equilin (X).

The above reactions can be modified within wide limits, both with respect to the reagents used as to the conditions under which they are carried out; for example, as has been already mentioned, there can be started from the respective testosterone esterified at C–17 with a radical of a carboxylic acid different from acetic acid, and thus the intermediates II–V are obtained under the form of the corresponding 17-esters; instead of the ethyl-enol-ether of II, there can be prepared other lower alkyl-enol-ethers by substituting for the ethyl orthoformate other triesters of orthoformic acid formed with a lower aliphatic alcohol; I can be converted into its enol-acetate or other lower fatty enol acylate and then brominated to produce III (cf. Velluz, Bull. Soc. Chim., 1289 (1948)); by substituting hypobromous acid by hypochlorous acid there is obtained the 6β-chloro-analog of III, the resulting ester of 6β-chloro-testosterone or its 19-nor-analog can then be dehydrochlorinated to produce IV; an ester of a 6α-analog of III can be dehydrohalogenated by first inverting the configuration of the 6β-compounds by means of an acid treatment, for example with concentrated hydrochloric acid in mixture with acetic acid, for the dehydrohalogenation, the dimethylformamide can be substituted by another adequate solvent, such as dimethylacetamide for example.

The following specific examples serve to illustrate but are not intended to limit the present invention.

*Example I*

To a solution of 4.73 g. of 19-nor-testosterone 17-acetate in 24 cc. of anhydrous dioxane there was added 5 cc. of ethyl orthoformate and then 0.64 g. of a solution of 500 mg. of p-toluene-sulfonic acid monohydrate in 5.4 cc. of dioxane and 1.1 cc. of absolute ethanol; the mixture was kept at room temperature for 1 hour, the solvent was evaporated under reduced pressure and the residue was crystallized from methanol. There was thus obtained 3 - ethoxy - 19 - nor - Δ$^{3,5}$-androstadien-17β-ol 17-acetate; M.P. 133–134° C.; [α]$_D$ —187° (chloroform);

$\lambda_{max.}^{EtOH}$ 240–242 mμ, log E 4.38

A solution of 1.73 g. of the above compound in 140 cc. of acetone was cooled to 5° C. and treated with 10.4 cc. of water and 1.04 g. of anhydrous sodium acetate; the mixture was then treated with stirring with 1.33 g. of N-bromosuccinimide and 1.04 cc. of glacial acetic acid and then stirred for 1 hour at a temperature around 5° C. After diluting with water, the product was extracted with benzene and the extract was washed with water, dried over anhydrous sodium sulfate and evaporated to dryness. The residue consisted of the crude 6β-bromo-19-nor-testosterone 17-acetate which was used for the next step without further purification. In another experiment the pure compound was obtained by recrystallization from ether.

The above crude acetate was mixed with 3.2 g. of calcium carbonate and 40 cc. of dimethylformate and refluxed under an atmosphere of nitrogen for 1 hour; the mixture was cooled, filtered and the filtrate was diluted with water and extracted with ethyl acetate. The extract was washed with water, dried over anhydrous sodium sulfate and the ethyl acetate was evaporated. The residue was chromatographed on neutral alumina and the solid fractions were recrystallized from acetone. There was thus obtained 19-nor-Δ$^{4,6}$-androstadien-17β-ol-3-one 17-acetate; M.P. 113–114° C.; [α]$_D$ —38° (chloroform);

$\lambda_{max.}^{EtOH}$ 282–284 mμ, log E 4.29

A mixture of 2.5 g. of the above compound, 2 cc. of pyridine, 20 cc. of acetyl chloride and 50 cc. of acetic anhydride was refluxed for 2 hours under an atmosphere of nitrogen. The solvent was evaporated under reduced pressure and the residue crystallized from methanol. There was thus obtained 19-nor-Δ$^{3,5,7}$-androstatriene-3,17β-diol diacetate; M.P. 163–165° C.; [α]$_D$ —28.6° (chloroform);

$\lambda_{max.}^{EtOH}$ 300 mμ, 312 mμ and 328 mμ; log E 4.32, 4.41 and 4.21

A solution of 2 g. of the above compound in a mixture of 50 cc. of methanol and 50 cc. of tetrahydrofurane was mixed with a solution of 1 g. of sodium borohydride in 10 cc. of water and refluxed for 1 hour; after cooling, the excess of hydride was decomposed by the slow addition of acetic acid and the mixture was then concentrated to a small volume, diluted with water and extracted with ethyl acetate; the extract was washed with water, dried over anhydrous sodium sulfate and evaporated to dryness. Recrystallization of the residue from methanol furnished 19-nor-Δ$^{5,7}$-androstadien-3β,17β-diol; M.P. 192–195° C.; [α]$_D$ +287° (chloroform);

$\lambda_{max.}^{EtOH}$ 272 mμ, 282 mμ and 296 mμ; log E 4.05, 4.06 and 3.80

1.6 g. of the above diol was dissolved in 300 cc. of toluene and 20 cc. of cyclohexanone and 30 cc. of solvent was distilled in order to remove traces of moisture; to the hot solution there was added 1.6 g. of aluminum isopropylate in 20 cc. of anhydrous toluene and the mixture was refluxed for 3 hours, diluted with water and aqueous solution of sodium potassium tartrate and subjected to steam distillation. The cooled residue was extracted with ethyl acetate and the extract was washed with water, dried over anhydrous sodium sulfate and evaporated to dryness. The residue was chromatographed on 60 g. of silica gel. The eluates obtained with benzene-ether (9:1) gave a solid residue which was crystallized from ether. There was thus obtained 19-nor-Δ$^{4,7}$-androstadiene-3,17-dione; M.P. 148–149° C.; [α]$_D$ +127° (chloroform);

$\lambda_{max.}^{EtOH}$ 2.38 mμ, log E 4.10

30 cc. of a 1% aqueous yeast extract medium was placed in each of 30 Erlenmeyer flasks of 125 cc. and the contents of each flask was inoculated with a culture of *Corynebacterium simplex* ATCC 6946 obtained by incubation for 24 hours of an aqueous medium of 1% yeast extract with a suspension of such bacteria. The medium thus inoculated was stirred for 24 hours at 28° C. There was thus obtained the culture of Corynebacterium which was employed for the incubation with the steroid.

To each flask there was then added 1 cc. of 1% ethanol solution of 19-nor-$\Delta^{4,7}$-androstadiene-3,17-dione, which solution had been prepared in distilled ethanol, without heating and just before its use. The mixtures were then incubated for 24 hours at 28° C. with continuous stirring; in other experiments the incubation time was extended to 72 hours, without altering the result of the incubation.

The contents of the flasks were combined in three fractions and each was extracted with 5 portions of 500 cc. each of methylene chloride. The extracts were combined, washed with water, dried over anhydrous sodium sulfate and the methylene dichloride was evaporated. The residue was purified by chromatography on washed alumina, eluting the product with mixtures of benzene and ether. Recrystallization from ethyl acetate yielded equilin, identical with an authentic sample of the material.

Example II

A culture of *Septomyxa affinis* ATCC 6737 was prepared by inoculating an aqueous medium containing 2% of peptone and 5% corn syrup with a vegetating growing culture of such fungus in the same medium. The mixture was then incubated under stirring at a temperature around 28° C.

To each liter of the Septomyxa culture thus obtained there was added 30 cc. of an ethanol solution of 19-nor-$\Delta^{4,7}$-androstadiene-3,17-dione, which solution had been prepared just before its use in distilled ethanol. The mixture was stirred for 24 hours at a temperature of around 28° C. and with aeration; in other experiments the incubation period was extended up to 72 hours with the same final result.

The product was extracted with several portions of methylene chloride, the extract was washed with water, dried over anhydrous sodium sulfate and concentrated to a small volume under reduced pressure. The residue was subjected to chromatography on washed alumina, eluting with mixture of benzene and ether. Recrystallization from ethyl acetate furnished equilin, identical with the one obtained in accordance with the method of the previous example.

Example III

Testosterone acetate was converted into $\Delta^{4,7}$-androstadiene-3,17-dione by following the method described in Example I. The latter was then incubated with a culture of *Septomyxa affinis* ATCC 6737, exactly as described in Example II, and then incubation product was isolated. There was thus obtained $\Delta^{1,4,7}$-androstatriene-3,17-dione.

A mixture of 500 mg. of $\Delta^{1,4,7}$-androstatriene-3,17-dione and 50 cc. of mineral oil was slowly passed through a glass tube packed with glass helices and heated to approximately 600° C. The resulting turbid solution was cooled, adsorbed in a column of 20 g. of washed alumina and the column was washed with hexane to remove the mineral oil and the product was then eluted with mixtures of benzene and ether. Recrystallization from ethyl acetate produced equilin, having identical properties to those of the final compounds obtained in accordance with the previous examples.

Example IV

A mixture of 1 g. of $\Delta^{4,7}$-androstadiene-3,17-dione, 50 cc. of tertiary butanol, 0.5 g. of selenium dioxide and 0.5 cc. of pyridine was refluxed for 72 hours under an atmosphere of nitrogen. The cooled mixture was filtered through celite, washing the filter with hot tertiary butanol, the filtrate and washings were combined and the solvent was evaporated under reduced pressure. The residue was dissolved in acetone and the solution was refluxed for half an hour with decolorizing charcoal, dried over anhydrous sodium sulfate, filtered and the acetone was evaporated. Chromatography of the residue on neutral alumina afforded $\Delta^{1,4,7}$-androstatriene-3,17-dione.

We claim:
1. The 17-hydrocarbon carboxylic acid esters of up to 12 carbon atoms of 3-lower alkoxy-19-nor-$\Delta^{3,5}$-androstadien-17β-ol.
2. The 17-hydrocarbon carboxylic acid esters of up to 12 carbon atoms of 3-lower fatty acyloxy-19-nor-$\Delta^{3,5,7}$-androstatrien-17β-ol.
3. A process for the production of equilin comprising reacting a 19-nor-testosterone acylate of a hydrocarbon carboxylic acid of up to 12 carbon atoms with a lower alkyl orthoformate to form the corresponding lower alkyl enol ether, reacting the ether with hypobromous acid to prepare the corresponding 6β-bromo-19-nor-testosterone acylate, dehydrobrominating the last mentioned acylate to form the corresponding $\Delta^{4,6}$ compound, heating the $\Delta^{4,6}$ compound with acetyl chloride and acetic anhydride to form the corresponding $\Delta^{3,5,7}$-19-nor-androstatrien-3β,17β-diol 3-acetate 17-acylate, reacting the last mentioned compound with sodium borohydride to form $\Delta^{5,7}$-19-nor-androstadien-3β,17β-diol, subjecting the last mentioned compound to Oppenauer oxidation to form $\Delta^{4,7}$-19-nor-androstadien-3,17-dione and dehydrogenating said last mentioned compound with a microorganism selected from the group consisting of *Corynebacterium simplex*, Mycrobacterium and Septomyxa.
4. The process of claim 3 wherein the dehydrogenation is conducted with *Corynebacterium simplex* ATCC 4964, in an aqueous medium containing yeast extract, at temperatures around 28° C. and for a period of time between 12 and 72 hours.
5. The process of claim 3 wherein the dehydrogenation is conducted with *Septomyxa affinis* ATCC 6737 in an aqueous medium containing peptone and corn syrup, at temperatures around 28° C., under aeration, and for a period of 12 to 72 hours.
6. A process for the production of equilin comprising reacting testosterone acylate of a hydrocarbon carboxylic acid of up to 12 carbon atoms with a lower alkyl orthoformate to form the corresponding lower alkyl enol ether, reacting the ether with hypobromous acid to prepare the corresponding 6β-bromo-testosterone acylate, dehydrobrominating the last mentioned acylate to form the corresponding $\Delta^{4,6}$ compound, heating the $\Delta^{4,6}$ compound with acetyl chloride and acetic anhydride to form the corresponding $\Delta^{3,5,7}$-androstatrien-3β,17β-diol 3-acetate 17-acylate, reacting the last mentioned compound with sodium borohydride to form $\Delta^{5,7}$-androstadien-3β,17β-diol, subjecting the last mentioned compound to Oppenauer oxidation to form $\Delta^{4,7}$-androstadien-3,17-dione and dehydrogenating said last mentioned compound with a microorganism selected from the group consisting of *Corynebacterium simplex*, Mycrobacterium and Septomyxa, and heating the $\Delta^{1,4,7}$ compound thus formed in mixture with mineral oil at a temperature of approximately 600° C.
7. The process of claim 6 wherein the dehydrogenation is conducted with *Corynebacterium simplex* ATCC 4964, in an aqueous medium containing yeast extract, at temperatures around 28° C. and for a period of time between 12 and 72 hours.
8. The process of claim 6 wherein the dehydrogenation is conducted with *Septomyxa affinis* ATCC 6737 in an aqueous medium containing peptone and corn syrup, at temperatures around 28°, under aeration, and for a period of 12 to 72 hours.
9. A process for the production of equilin comprising reacting a 19-nor-testosterone acylate of a hydrocarbon carboxylic acid of up to 12 carbon atoms with a lower alkyl orthoformate to form the corresponding lower alkyl enol ether, reacting the ether with hypobromous acid to prepare the corresponding 6β-bromo-19-nor-testosterone acylate, dehydrobrominating the last mentioned acylate to form the corresponding $\Delta^{4,6}$ compound, heating the $\Delta^{4,6}$ compound with acetyl chloride and acetic anhydride to form the corresponding $\Delta^{3,5,7}$-19-nor-andro- stratrien-3β,17β-diol 3-acetate 17-acylate, reacting the last mentioned compound with sodium borohydride to form $\Delta^{5,7}$-19-nor-androstadien-3β,17β-diol, subjecting the last mentioned compound to Oppenauer oxidation to form $\Delta^{4,7}$-19-nor-androstadien-3,17-dione and dehydrogenating said last mentioned compound by refluxing with selenium dioxide in mixture with t-butanol in the presence of pyridine.

10. A process for the production of equilin comprising reacting testosterone acylate of a hydrocarbon carboxylic acid of up to 12 carbon atoms with a lower alkyl orthoformate to form the corresponding lower alkyl enol ether, reacting the ether with hypobromous acid to prepare the corresponding 6β-bromo-testosterone acylate, dehydrobrominating the last mentioned acylate to form the corresponding $\Delta^{4,6}$ compound, heating the $\Delta^{4,6}$ compound with acetyl chloride and acetic anhydride to form the corresponding $\Delta^{3,5,7}$-androstatrien-3β,17β-diol 3-acetate 17-acylate, reacting the last mentioned compound with sodium borohydride to form $\Delta^{5,7}$-androstadien-3β,17β-diol, subjecting the last mentioned compound to Oppenauer oxidation to form $\Delta^{4,7}$-androstadien-3,17-dione and dehydrogenating said last mentioned compound by refluxing with selenium dioxide in mixture with t-butanol in the presence of pyridine and heating the $\Delta^{1,4,7}$ compound thus formed in mixture with mineral oil at a temperature of approximately 600° C.

References Cited in the file of this patent
UNITED STATES PATENTS

| | | |
|---|---|---|
| 2,085,474 | Ruzicka | June 29, 1937 |
| 2,739,974 | Colton | Mar. 27, 1956 |
| 2,831,003 | Thomas | Apr. 15, 1958 |
| 2,835,680 | Fried | May 20, 1958 |
| 2,836,607 | Agnello et al. | May 27, 1958 |
| 2,838,492 | Pederson et al. | June 10, 1958 |
| 2,874,170 | Colton | Feb. 17, 1959 |
| 2,876,219 | Campbell et al. | Mar. 3, 1959 |
| 2,885,397 | Djerassi et al. | May 5, 1959 |

OTHER REFERENCES

Fried et al.: "Recent Progress in Hormone Research," vol. XI (1955), Academic Press Inc., New York, pages 149–181.

Zderic et al.: J.A.C.S., vol. 80, pages 2596–7, May 20, 1958.

Levy et al.: J.A.C.S., vol. 79, pages 2658–9 (1957).